(12) United States Patent
Chen et al.

(10) Patent No.: US 9,996,136 B2
(45) Date of Patent: *Jun. 12, 2018

(54) DATA TRANSFORM METHOD AND DATA TRANSFORMER

(71) Applicant: International Business Machines Corporation, Armonk, NY (US)

(72) Inventors: Ying Chen, Beijing (CN); Li Li, Beijing (CN); Liang Liu, Beijing (CN); Peini Liu, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/799,929

(22) Filed: Jul. 15, 2015

(65) Prior Publication Data
US 2015/0316972 A1 Nov. 5, 2015

Related U.S. Application Data

(63) Continuation of application No. 13/239,637, filed on Sep. 22, 2011, now Pat. No. 9,110,660.

(30) Foreign Application Priority Data

Sep. 30, 2010 (CN) .......................... 2010 1 0507990

(51) Int. Cl.
*G06F 1/26* (2006.01)
*G06F 1/32* (2006.01)
*G06F 17/30* (2006.01)

(52) U.S. Cl.
CPC ...... *G06F 1/3203* (2013.01); *G06F 17/30569* (2013.01)

(58) Field of Classification Search
CPC .................. G06F 1/3203; G06F 17/30569
(Continued)

(56) References Cited

U.S. PATENT DOCUMENTS 6,151,608 A 11/2000 Abrams .................. 707/679
7,407,108 B1 8/2008 Euler
(Continued)

FOREIGN PATENT DOCUMENTS

CN 1984328 A 6/2007
CN 101047549 A 10/2007
(Continued)

OTHER PUBLICATIONS

Alkis Simitsis et al., Partitioning Real-Time ETL Workflows, NTII 2010, Mar. 6, 2010, 159-162, Long Beach, CA.
(Continued)

*Primary Examiner* — Paul R Myers
(74) *Attorney, Agent, or Firm* — Fleit Gibbons Gutman Bongini Bianco PL; Thomas S. Grzesik

(57) ABSTRACT

A data transform method and a data transformer. The method includes: importing a data transform rule; acquiring from the data transform rule a source data definition, a destination data definition and a data transform rule definition; predicting resource energy consumption parameters of a data transform node server according to the source data definition, the destination data definition and the data transform rule definition; and deploying a resource energy consumption optimization policy of the data transform node server according to the predicted resource energy consumption parameters of the data transform node server.

20 Claims, 5 Drawing Sheets

(58) Field of Classification Search
USPC .......................................................... 713/320
See application file for complete search history.

(56) References Cited

U.S. PATENT DOCUMENTS

| | | | |
|---|---|---|---|
| 7,660,884 B2 | 2/2010 | Pu | |
| 7,769,843 B2 | 8/2010 | Neuse et al. .................. | 709/223 |
| 7,856,549 B2 | 12/2010 | Wheeler ...................... | 713/1 |
| 7,899,935 B2 | 3/2011 | Zhu et al. .................... | 709/246 |
| 7,925,873 B2 | 4/2011 | Vaidyanathan et al. ......... | 713/1 |
| 7,930,573 B2 | 4/2011 | Bland et al. .................. | 713/320 |
| 8,127,298 B2 | 2/2012 | Kato et al. .................... | 718/104 |
| 8,145,927 B2 | 3/2012 | Okitsu et al. ................. | 713/320 |
| 8,209,687 B2 | 6/2012 | Yuyitung et al. .................. | 718/1 |
| 8,532,974 B2 | 9/2013 | Guo et al. ....................... | 703/22 |
| 9,110,660 B2* | 8/2015 | Chen ..................... | G06F 1/3203 |
| 2007/0162780 A1 | 7/2007 | Wang | |
| 2008/0028249 A1 | 1/2008 | Agrawal | |
| 2009/0007128 A1 | 1/2009 | Borghetti et al. ............. | 718/104 |
| 2009/0132649 A1 | 5/2009 | Hubbard | |
| 2010/0005326 A1 | 1/2010 | Archer | |
| 2012/0053925 A1 | 3/2012 | Geffin et al. .................... | 703/21 |

FOREIGN PATENT DOCUMENTS

| | | |
|---|---|---|
| JP | 2001167059 | 6/2001 |
| JP | 2004078427 | 3/2004 |
| JP | 2009159712 | 7/2009 |

OTHER PUBLICATIONS

Bianchini, R. et al, "Power and Energy Management for Server Systems", IEEE Service Center, vol. 37, No. 11, pp. 68-74, Nov. 1, 2004.

Kansal, A., et al, "Fine-grained Energy Profiling for Power-aware application design", Performance Evaluation Review, vol. 36, No. 2, pp. 26-30, Sep. 2, 2008.

* cited by examiner

DATA TRANSFORM METHOD AND DATA TRANSFORMER

CROSS REFERENCE TO RELATED APPLICATION

This application is a continuation of and claims priority from U.S. application Ser. No. 13/239,637 filed on Sep. 22, 2011, which is based on based upon and claims priority from Chinese Patent Application No. 201010507990.X, filed on Sep. 30, 2010, the disclosures of which are hereby incorporated by reference in their entirety.

BACKGROUND OF THE INVENTION

Technical Field

The present invention relates to data transformation, and more particularly to an energy saving data transform method and a data transformer.

Description of the Related Art

Data transform is a widely used technique in management software for transforming data from one representative form to another. For example, an overall software upgrade includes an overall database upgrade, and with each software being different in regards to its background database architecture and data storage form, data often needs to be imported, exported and transformed. Furthermore, for example, due to the increasing amounts of data, the original data architecture design becomes unwieldy and cannot satisfy the requirements of various aspects. Due to the replacement of the database and the data structure, a data transform is needed. A data transform is particularly important in the process of integrating data from different products to realize integration of software products.

Since a data transform consumes many system resources, reducing system energy consumption during the process becomes a critical problem. At present, researchers have developed many energy-saving techniques which can be divided into two categories: dynamic techniques and static techniques. The static techniques enable the system to enter a low power consumption state by setting a low power consumption operation mode. For example, clocks or power supplies of different components inside the chip are provided with a low power consumption mode switch. However, the static mode cannot dynamically adjust the resource energy consumption according to the real time usage conditions of the resources. The dynamic techniques predict future load conditions according to a history load of the system and dynamically scale operating frequency and voltage of the chip, thereby saving energy, for example using the Dynamic Voltage and Frequency Scaling (DVFS) technique. A pitfall of the dynamic techniques, however, is that they need to predict the next load according to the historical load, and different predicting algorithms vary greatly in accuracy. In addition, there often exists a relatively large deviation between the historical load and the actual load, so the predicted result in an actual application can be very inaccurate.

SUMMARY OF THE INVENTION

In view of the above problems, the present invention provides a data transform method and a data transformer.

According to a first aspect, the present invention provides a data transform method, including: importing a data transform rule; acquiring from the data transform rule a source data definition, a destination data definition and a data transform rule definition; predicting resource energy consumption parameters of a data transform node server according to the source data definition, the destination data definition and the data transform rule definition; and deploying a resource energy consumption optimization policy of the data transform node server according to the predicted resource energy consumption parameters.

According to another aspect, the present invention provides a data transformer including: importing means configured to import a data transform rule; acquiring means configured to acquire from the data transform rule a source data definition, a destination data definition and a data transform rule definition; predicting means configured to predict resource energy consumption parameters of a data transform node server according to the source data definition, the destination data definition and the data transform rule definition; and deploying means configured to deploy a resource energy consumption optimization policy of the data transform node server according to the predicted resource energy consumption parameters of the data transform node server.

BRIEF DESCRIPTION OF THE SEVERAL VIEWS OF THE DRAWINGS

The invention per se, preferred embodiments thereof, and objects and advantages of the invention will be better understood with reference to the description of the following illustrative embodiments in combination with accompanying drawings, wherein.

DETAILED DESCRIPTION OF THE PREFERRED EMBODIMENT

The objects and advantages of the invention will be better understood by describing the method according to the embodiments of the invention below in combination with the accompanying drawings.

The data transform method according to the embodiments of the present invention divides the data transform into three phases: a data extracting phase, a data processing phase and a data storing phase. An energy saving policy is deployed by analyzing the energy consumption parameters in the three phases. The data extracting phase and the data storing phase primarily influence the loads of the source node server and the destination node server. The data processing phase primarily influences a load of the data transform node server, so that energy consumption requirements of the source node server, the data transform node server and the destination node server can be evaluated according to load conditions in the three phases, thereby determining an energy consumption optimization policy.

Figure 1:
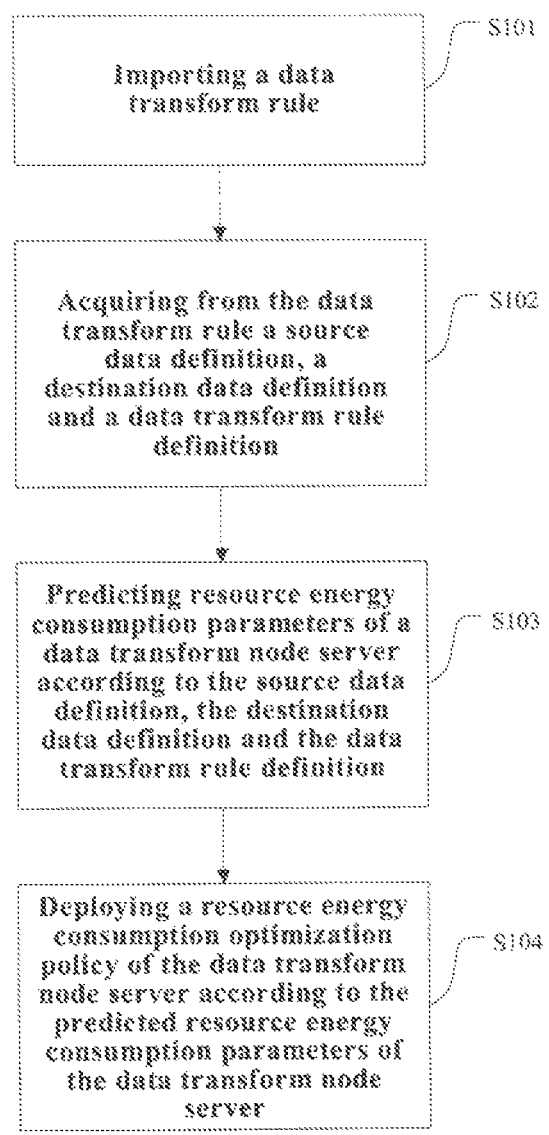
FIG. 1 shows a data transform method according to an embodiment of the invention.

FIG. 1 shows a data transform method according to an embodiment of the invention, including: a step S101 of importing a data transform rule; a step S102 of acquiring from the data transform rule a source data definition, a destination data definition and a data transform rule definition; a step S103 of predicting resource energy consumption parameters of a data transform node server according to the source data definition, the destination data definition and the data transform rule definition; and a step S104 of deploying a resource energy consumption optimization policy of the data transform node server according to the predicted resource energy consumption parameters of the data transform node server.

According to an embodiment of the invention, the resource energy consumption parameters include at least one of CPU energy consumption, memory utilization rate, and disk I/O utilization rate. A data definition is data for describing data and for describing information relating to content, coverage, quality, management mode, data ownership, data provision mode of elements, data sets, a series of data sets, and the like. According to the difference in the objects described by the data definition, the present invention uses "source data definition" and "destination data definition" to represent, respectively, a data definition for describing the data source and a data definition for describing the data storage destination.

The data transform rule is used for specifying how the data is transformed from the form described by the source data definition to the form described by the destination data definition. Typical data transform rules include at least: a transform rule identifier (optional), a source data data object, a destination data data object and an operating type. The following shows a class BNF definition of the data transform rule:

```
TransformationRule::={[RuleID]":"<SourceDataAttribute>":"<DestinationDataAttribute>":"<Operation>}
Operation::={DirectCopy|TypeConvert|Macro}
```

The data transform rule definition includes a plurality of data transform rules for describing how to transform from the source data definition to the destination data definition.

The following example describes the source data definition "ke9_crac_data" in a form of XML Schema, which includes a complex data type consisting of "Node", "Begin_Time", "Description" and "Ambient_Temp" in order, whose types respectively are "varchar", "string", "varchar" and "real".

```
<?xml version="1.0" encoding="UTF-8"?>
<xs:schema xmlns:xs="http://www.w3.org/2001/XMLSchema"
targetNamespace="http://www.xxx.com.cn"
xmlns="http://www.xxx.com.cn"
elementFormDefault="qualified">
<xs:element name="ke9_crac_data">
    <xs:complexType>
        <xs:sequence>
            <xs:element name="Node" type="xs:varchar"/>
            <xs:element name="Begin_Time" type="xs:string"/>
            <xs:element name="Description" type="xs:varchar"/>
            <xs:element name="Ambient_Temp" type="xs:real"/>
        </xs:sequence>
    </xs:complexType>
</xs:element>
</xs:schema>
```

The following example describes the destination data definition "CRAC_dynamic" in a form of XML Schema, which includes a complex data type consisting of "node", "begin", "description" and "ambient_Temp" in order, whose types respectively are "varchar", "Date", "varchar" and "real".

```
<?xml version="1.0" encoding="UTF-8"?>
<xs:schema xmlns:xs="http://www.w3.org/2001/XMLSchema"
targetNamespace="http://www.xxx.com.cn"
xmlns="http://www.xxx.com.cn"
elementFormDefault="qualified">
<xs:element name="CRAC_dynamic">
    <xs:complexType>
        <xs:sequence>
            <xs:element name="node" type="xs:varchar"/>
            <xs:element name="begin" type="xs:Date"/>
            <xs:element name="description" type="xs:varchar"/>
            <xs:element name="ambient_Temp" type="xs:real"/>
        </xs:sequence>
    </xs:complexType>
</xs:element>
</xs:schema>
```

The following example is based on the above two examples and describes how to transform from the source data definition "ke9_crac_data" to the destination data definition "CRAC_dynamic" in a form of XML. The example involves four data transform rules for transforming "Node", "Begin_Time", "Description" and "Ambient_Temp" in the source data type to "node", "begin", "description" and "ambient_Temp" in the destination data definition, respectively, and the transform operations are "equal", "timestampConvert", "equal" and "equal", respectively, which shows that the operation of data type conversion is performed for "Begin_Time" and the operation of direct copying is performed for the other data types.

```
<?xml version="1.0" encoding="UTF-8"?>
<Transformation_Definition>
    <Table Name="CRAC" Type="dynamic">
        <Source>
            <AttributeGroup Name="ke9_crac_data">
                <Attribute Source="Node" Target="node" Type="varchar"
                    Rule="equal" />
                <Attribute Source="Begin_Time" Target="begin"
                    Type="Date"
                    Rule="timestampConvert" />
                <Attribute Source="Description" Target="description"
Type="varchar" Rule="equal" />
                <Attribute Source="Ambient_Temp" Target="ambient_temp"
                    Type="real" Rule="equal" />
            </AttributeGroup>
        </Source>
    </Table>
</Transformation_Definition>
```

Figure 2:
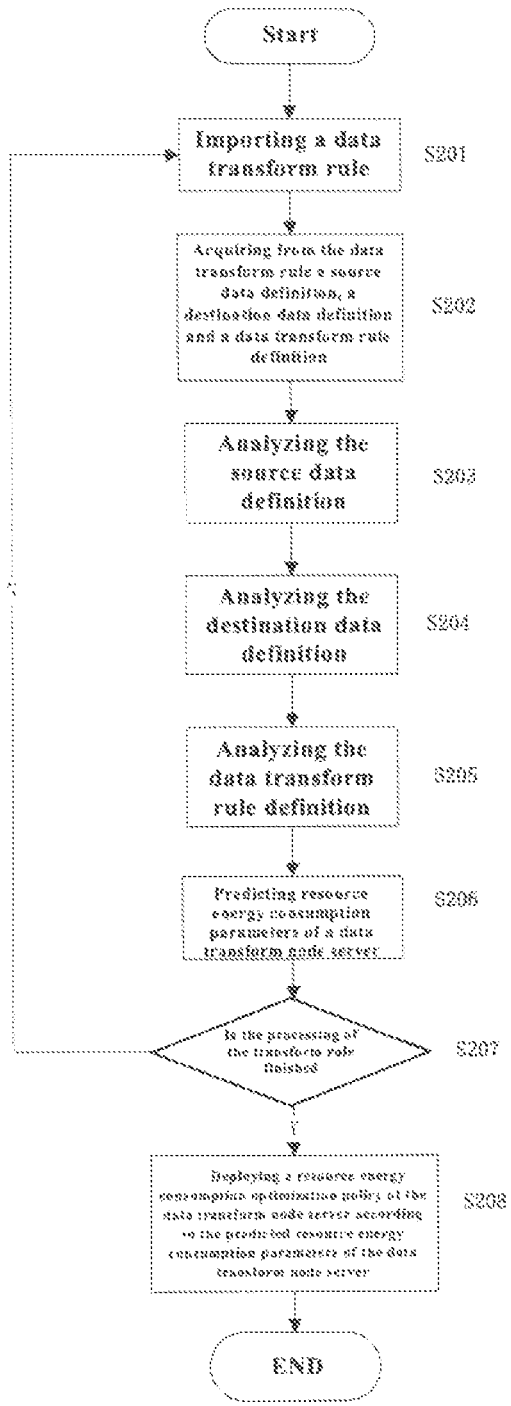
FIG. 2 is a flow chart showing a data transform method according to an embodiment of invention.

FIG. 2 is a flow chart showing a data transform method according to an embodiment of the invention. Step S201, importing a data transform rule, can for example represent the data transform rule in the above data transform rule example which describes how to transform from the source data definition "Ke9_crac_data" to the destination data definition "CRAC_dynamic" in a form of XML, for transforming "Node", "Begin-Time", "Description", "Ambient_Temp" in the source data definition to "node", "begin", "description" and "ambient_Temp" in the destination data definition.

Step S202, acquiring from the data transform rule a source data definition, a destination data definition and a data transform rule definition, can for example represent the source data definition "ke9_crac_data", the destination data definition "CRAC_dynamic" and the data transform rule definition describing how to transform from the source data definition "Ke9_crac_data" to the destination data definition "CRAC_dynamic," as shown in the above data transform rule example.

Figure 3:
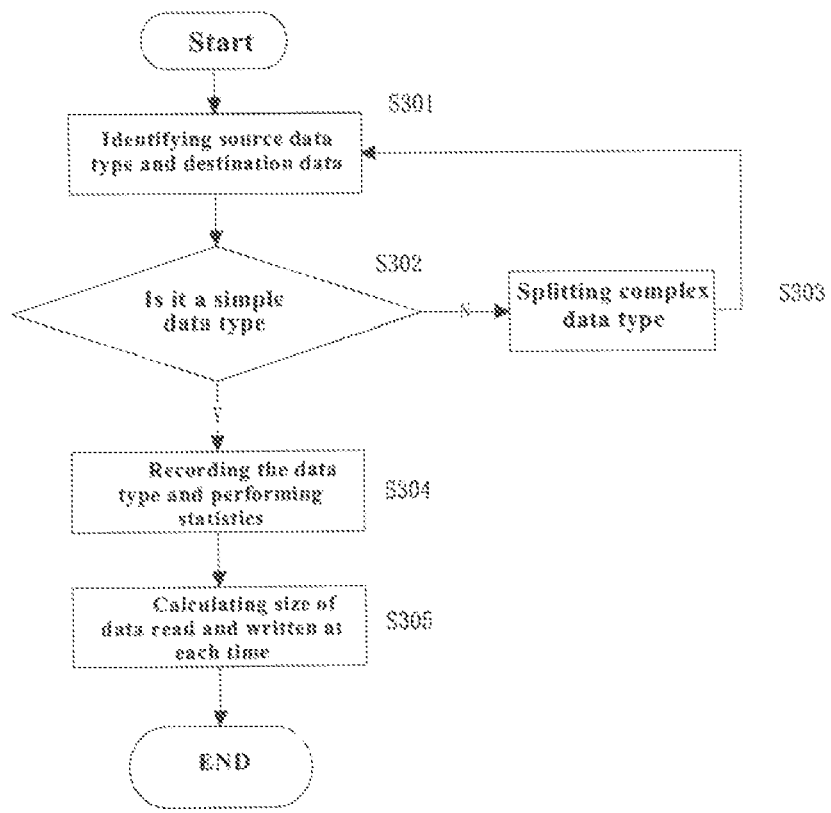
FIG. 3 is a flow chart showing analysis of the source data definition and destination data definition.

Steps of S203 and S204 include analyzing the source data definition and the destination data definition respectively. FIG. 3 is a flow chart showing analysis of the source data definition and the destination data definition in steps of S203 and S204. In step S301, it includes identifying source data type and destination data type firstly. Step S302 involves judging whether the source data type and the destination data type are simple data types. Herein the data type is divided into a simple data type and a complex data type, wherein the simple data type only represents a simple value which is a value stored in the lowest abstract layer and has a relatively rapid operating speed. Frequently seen simple data types include Integer type, Float type, Character (Char) type, Double type, Decimal type, Binary Large Object (BLOB) type and Enumeration (Enum) type etc. The complex data type is an organic entirety formed by combining a plurality of simple data types associated with each other. If the result of the judgment is 'No,' then the process proceeds to step S303, splitting the complex data type, and then the process returns to step S301 for identification until the complex data type is split into simple data types. If the result of the judgment is 'Yes,' then the process proceeds to step S304, recording the data type. In step S305, calculating size of the data read and written at each time, for the identified simple data type, the size thereof is decided by the type definition thereof and is available as general knowledge. For example, for data types of Java, the sizes of data of simple data types such as Integer type, Float type, and Character (Char) type are 32 bit, 32 bit, and 16 bit, respectively; however, for the identified complex data type, since it is formed by a plurality of simple data types associated with each other, the size of the data read and written at each time is a sum of the sizes of the data of the simple data types.

Figure 4:
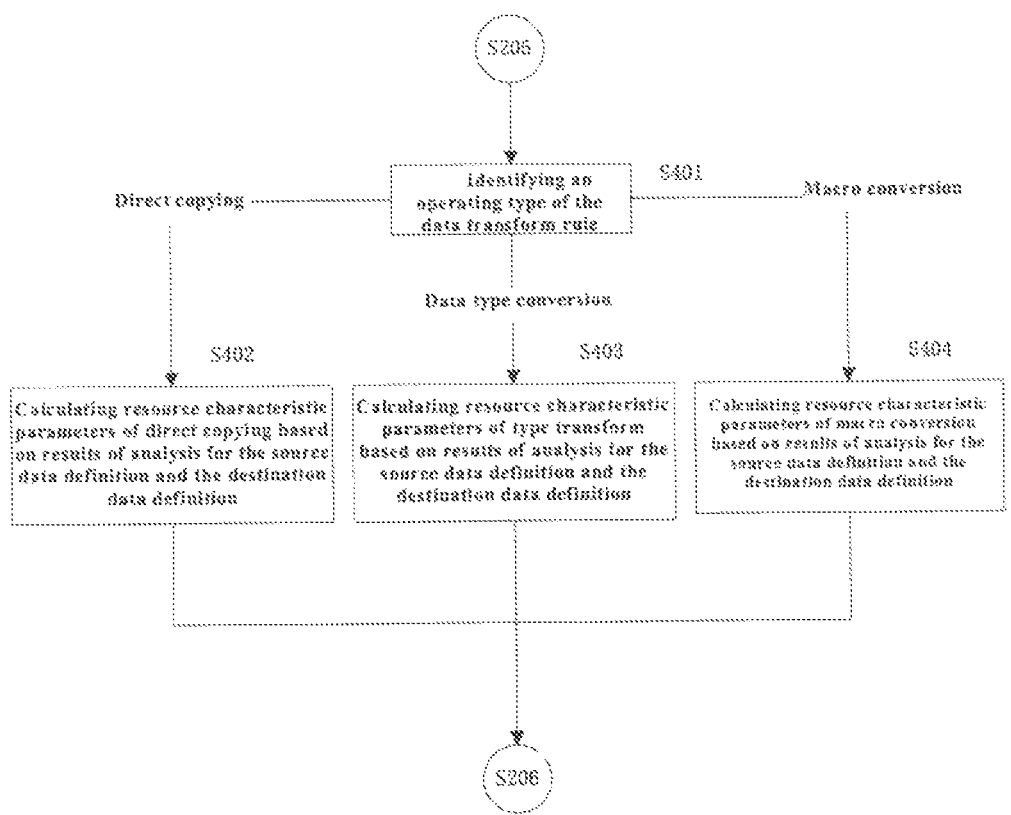
FIG. 4 is a flow chart showing analysis of the data transform rule definition.

Step S205 includes analyzing the data transform rule definition. FIG. 4 is a more detailed flow chart showing the analysis of the data transform rule definition. In step S401, an operating type of the data transform rule is firstly identified. In step S402, if it is identified that the operating type of the data transform rule is direct copying, then the action taken is calculating resource characteristic parameters of direct copying based on results of analysis for the source data definition and the destination data definition. Specifically, the resource characteristic parameters of direct copying include a direct copying rule identifier, a size of the data read and written at each time, a count of direct copying and a CPU load. In step S403, if it is identified that the operating type of the data transform rule is data type conversion, then the action taken is calculating resource characteristic parameters of data type transform based on results of analysis for the source data definition and the destination data definition. Specifically, the data type conversion is a conversion between data types, and the resource characteristic parameters of data type conversion include a data type transform rule identifier, a size of the data read and written at each time, a count of data type conversion and a CPU load. In step S404, if it is identified that the operating type of the data transform rule is macro conversion, then the action taken is calculating resource characteristic parameters of macro conversion based on results of analysis for the source data definition and the destination data definition. Specifically, the resource characteristic parameters of macro conversion include a macro conversion rule identifier, a size of the data read and written at each time, a macro operation CPU load, a count of macro operation, a count of basic operations performed in a unit time, and a CPU load for performing a basic operation.

The process advances to step S206, that is, predicting resource energy consumption parameters of a data transform node server, and more specifically, with respect to the data transform rule, predicting resource energy consumption parameters of the data transform node server in the data extracting phase, the data processing phase and the data storing phase, respectively.

According to an embodiment of the invention, if it is identified that the data transform type is that of direct copying, then predicting resource energy consumption parameters of the data transform node server in the data extracting phase, the data processing phase and the data storing phase follows, according to the resource characteristic parameters of direct copying. Since direct copying does not consume calculating resources in the three phases, it can be predicted that the CPU loads in the three phases all are low (L), and CPU energy consumption is low (L). Furthermore, since direct copying does not occupy memory and disk resources in the data processing phase, it can be predicted that both memory utilization rate and disk I/O utilization rate are low (L). However, in the data extracting phase and the data storing phase, the memory utilization rate and disk I/O utilization rate are associated with the number of the bytes read and written at each time (size), a count of reading and writing (count) and characteristics of the hard disk. Here, the influence of the size of the data read and written at each time (size) and the count of reading and writing (count) on the memory utilization rate and disk I/O utilization rate are taken into consideration. If a maximum speed of the disk is not reached, then the larger the number of the bytes read and written at each time (size) or the count of reading and writing (count) are, the larger the memory utilization rate and the disk I/O utilization rate are. According to an embodiment of the invention, a resource characteristic mapping table of Table 1 may be constructed in advance according to the size of the data read and written at each time (size) and the count of reading and writing (count), wherein a first threshold S1 and a second threshold S2 are preset for the size of the data read and written at each time (size), and a first threshold C1 and a second threshold C2 are preset for the count of reading and writing (count). In Table 1, M represents memory utilization rate, D represents disk I/O utilization rate, and L, M and H respectively represent low, middle, and high of the memory utilization rate and disk I/O utilization rate. It can be seen from Table 1 that if the size of the data read and written at each time s is less than the first threshold S1 and the count of reading and writing is less than the first threshold C1, the memory utilization rate is lower and the disk I/O utilization rate is lower too, since the size of the data read and written at each time is smaller and the count of reading and writing is fewer. In this case, M and D are set as "L". With the increase of the size of the data s and the increase of the count of copying, requirements for the memory utilization rate and the disk I/O utilization rate increasingly raise. It can be seen that, when the size of the data read and written at each time is $S1<=s<=S2$ and the count of reading and writing is $C1<=c<=C2$, M and D are respectively set as "M"; when the size of the data read and written at each time is $s>S2$ and the count of reading and writing is $c>C2$, M and D are respectively set as "H". For the threshold S1 and S2 and C1 and C2, they can be set according to actual usage conditions of the resources, and for the standards for the memory utilization rate M and the disk I/O utilization rate D to be high (H), middle (M) or low (L), they can be set according to different standards, for example, a memory utilization rate less than 10% is "L" and a memory utilization rate larger than 80% is "H". By comparing the size of the data read and written at each time and the count of reading and writing in the obtained resource characteristic parameters of direct copying with the parameters in the resource characteristic mapping table, the memory utilization rate and the disk I/O utilization rate can be determined as high, middle or low.

TABLE 1

Resource characteristic mapping table of the memory and disk

| | Data Size | | |
|---|---|---|---|
| Count | s < S1 | S1 <= s <= S2 | s > S2 |
| C < C1 | M = "L" | M = "L" | M = "M" |
| | D = "L" | D = "L" | D = "M" |
| C1 <= c <= C2 | M = "L" | M = "M" | M = "H" |
| | D = "M" | D = "M" | D = "M" |
| c > C2 | M = "M" | M = "H" | M = "H" |
| | D = "M" | D = "M" | D = "H" |

According to an embodiment of the invention, if it is identified that the data transform type is that of data type conversion, then resource energy consumption parameters of the data transform node server in the data extracting phase, the data processing phase and the data storing phase are predicted according to resource characteristic parameters of data type conversion. Since data type conversion has lower requirements for CPU resources in the data extracting phase and the data storing phase, the energy consumption of CPU is set as low "L". In the data processing phase of data type conversion, the CPU energy consumption condition corresponding to a specific data type conversion can be determined according to the specific data type conversion. For a conversion between numerical types, e.g. a conversion from integer type (int) to double type, one can predict that energy consumption requirement of CPU is low "L," since it does not need to consume much calculating resources. For a conversion between a numerical type and a character type, e.g. a conversion from integer type (int) to character string type or from character string type to integer type (int), one can predict that the energy consumption requirement of the CPU is middle "M," since it will consume more calculating resources. In a specific implementation, CPU energy consumption requirement conditions corresponding to the conversion data type that may be used can be recorded in advance as a knowledge database. By retrieving the knowledge database, CPU energy consumption requirement conditions corresponding to a specific data transform type can be acquired. For energy consumption conditions of the memory and disk I/O, the memory utilization rate and the disk I/O utilization rate may be set as low "L," since memory and disk resources are not occupied in the data processing phase. Since memory and disk resources need to be occupied in the data extracting phase and the data storing phase, the memory utilization rate and the disk I/O utilization rate need to be determined according to the size of the data read and written at each time with the count of reading and writing. According to an embodiment of the invention, a resource characteristic mapping table e.g. as shown in Table 1 can be constructed in advance. The first threshold S1 and the second threshold S2 for the size of the data can be read and written at each time, the first threshold C1 and the second threshold C2 for the count of data type conversion can be preset, and the memory utilization rate and the disk I/O utilization rate can be classified as high, middle and low according to empirical values. By comparing the size of the data read and written at each time and the count of the data type conversion in the obtained resource characteristic parameters of the data type conversion with the parameters in the resource characteristic mapping table, the memory utilization rate and the disk I/O utilization rate can be determined as high, middle and low.

According to an embodiment of the invention, if it is identified that the data transform type is macro conversion, resource energy consumption parameters of the data transform node server in the data extracting phase, the data processing phase and the data storing phase are predicted according to resource characteristic parameters of macro conversion. For the calculation of resources in the processing phase, the CPU load is calculated first. In order to obtain the count of basic operations in the macro operation, the macro operation can be semantically analyzed to generate a parsing tree, wherein nodes in the parsing tree include program nodes, basic operation nodes and operand nodes. By performing statistics for the basic operation nodes and dividing it by an execution time, a count of each basic operation executed in a unit time can be obtained. For a CPU load performing a basic operation, the CPU load required for performing the basic operation can be evaluated for the basic operation implemented using a certain language in a specific operating environment. For example, a PENTIUM® CPU can perform an addition operation of the C language in one clock period. By multiplying the count of each basic operation executed in a unit time with the CPU load required for performing the one basic operation, a CPU load required for performing all the basic operations in a unit time can be obtained. Further, by performing weighted summing of the CPU loads of all the basic operations of the macro operation, the CPU load of the macro operation is obtained. That is, by respectively calculating the CPU load of each basic operation of the macro operation occurring in the data processing phase according to the results of the parsing tree and performing weighted summing of the CPU loads of all the basic operations, a CPU load required by one macro operation is obtained.

The following is an example showing a data transform rule for coordinate conversion (x, y, z→x', y', z') according to an embodiment of the invention, wherein the operating type of the data transform rule is macro operation, and the count of the macro operation is 2.

If (direction'=direction; origin=origin') then $X'(x+\text{offset}\_x)*2*0.3048;$ $Y'=(\text{width}+\text{offset}\_y-y)*2*0.3048;$ $Z'=Z*4.445/100+\text{raised\_height}$ The above macro operation is semantically analyzed to generate a parsing tree which includes an if node, addition node, subtraction node, multiplication node and division node. The final statistical result is that, the count of addition is 3, the count of subtraction is 1, the count of multiplication is 5, and the count of division is 1. Since the Float type has more multiplication, division, addition and subtraction operations, in a particular hardware environment, the data transform rule has a higher CPU load in the processing phase.

The CPU energy consumption conditions of the macro operation in the data extracting phase and the data storing phase can be measured by the CPU load in the data extracting phase or the data storing phase. According to an embodiment of the invention, a CPU resource characteristic mapping table, e.g. as shown in Table 2, can be constructed in advance, and the resource requirement of CPU is determined by using the CPU load required by one macro operation and count of the macro operation, wherein the CPU load required by one macro operation can be obtained by the following method: calculating the CPU load of each basic operation in the macro operation in the data extracting phase or data storing phase according to the results of the parsing tree, and performing weighted summing of the CPU loads in the data extracting phase and the data storing phase to obtain the CPU load required by one macro operation. The first threshold X1 and the second threshold X2 of the CPU load required by one macro operation, and the first threshold C1 and the second threshold C2 for the count of macro operation are preset, and the CPU load can be classified as high, middle or low according to empirical values. By comparing the CPU load of one macro operation in the data extracting phase or the data storing phase and the count of a macro operation with the first and second threshold X1 and X2 of the CPU load and the first and second threshold of the count of macro operation in Table 2, respectively, the CPU energy consumption can be determined as high (H), middle (M) or low (L).

By taking the data transform rule for coordinate conversion (x, y, z→x', y', z') as an example, in the data extracting phase and the data storing phase, the calculating amount is lower since there are no numerical operations, thus the CPU load is low since the count of macro operation is less than the preset first threshold C1.

TABLE 2

CPU resource characteristic mapping table

| count of macro operation | CPU load | | |
|---|---|---|---|
| | $x < X1$ | $X1 <= x <= X2$ | $x > X2$ |
| $c < C1$ | CPU = "L" | CPU = "M" | CPU = "M" |
| $C1 <= c <= C2$ | CPU = "M" | CPU = "H" | CPU = "H" |
| $c > C2$ | CPU = "M" | CPU = "H" | CPU = "H" |

For the memory and disk reading/writing energy consumption conditions of the macro operation in the data extracting phase and the data storing phase, a memory and disk resource characteristic mapping table as shown in Table 3 can be constructed. The data size corresponds to the size of the data read and written at each time in the data extracting phase and the data storing phase and the count corresponds to the number of extracted and stored numerical values, which can be obtained from the parsing tree. For the size of the data read and written at each time, the first threshold S1 and the second threshold S2 are set, and for the count of basic operations, the first threshold C1 and the second threshold C2 are set. The thresholds S1 and S2 and C1 and C2 can be set according to actual usage conditions of the resources, and for the standards for the memory utilization rate M and the disk I/O utilization rate D being high (H), middle (M) or low (L), they can be set according to different standards. By comparing the size of the data read and written at each time, and the count of macro conversion in the resource characteristic parameters obtained in the data extracting phase or the data storing phase with the parameters in the resource characteristic mapping table, the memory utilization rate M and the disk I/O utilization rate can be determined as high (H), middle (M) or low (L).

By taking the above data transform rule for coordinate conversion (x, y, z→x', y', z') as an example, it can be seen from the parsing tree that the number of numerical values extracted in the data extracting phase is 11, the number of numerical values stored in the data storing phase is 3, the number of numerical values involved in the data extracting and data storing phases is less, and the count of basic operations is less, and the size of the data read and written at each time is less too, so the memory utilization rate and the disk I/O utilization rate both are low.

TABLE 3

Memory and disk resource characteristic mapping table

| Number of values extracted and stored | data size | | |
|---|---|---|---|
| | $s < S1$ | $S1 <= s <= S2$ | $s > S2$ |
| $c < C1$ | M = "L" D = "L" | M = "L" D = "L" | M = "M" D = "M" |
| $C1 <= c <= C2$ | M = "L" D = "M" | M = "M" D = "M" | M = "H" D = "M" |
| $c > C2$ | M = "M" D = "M" | M = "H" D = "M" | M = "H" D = "H" |

Since the macro operation does not need disk resources in the data processing phase, the disk I/O utilization rate is low "L", and the memory utilization shall be determined according to specific conditions. According to an embodiment of the invention, a memory resource characteristic mapping table as shown in Table 4 can be constructed, wherein the memory utilization rate is determined as high, middle or low according to the size of the data read and written at each time and the count of intermediate values in the data processing phase. The count of intermediate values can be obtained from the parsing tree. For the size of the data read and written at each time, the first and second threshold S1 and S2 are set, and for the count of intermediate values, the first and second threshold C1 and C2 are set. The thresholds S1 and S2 and C1 and C2 can be set according to actual usage conditions of the resources, and for the standards for the memory utilization rate M being high (H), middle (M) or low (L), they can be set according to different standards. By comparing the size of the data read and written at each time and the number of intermediate values in the resource characteristic parameters obtained during macro conversion with the parameters in the resource characteristic mapping table, the memory utilization rate M can be determined as high (H), middle (M) or low (L).

By taking the above data transform rule for coordinate conversion (x, y, z→x', y', z') as an example, it can be seen from the parsing tree that, the number of intermediate values is 6 and the size of the data read and written at each time is lesser too, so the memory utilization rate is low.

TABLE 4

Memory resource characteristic mapping table

| Number of intermediate values | data size | | |
|---|---|---|---|
| | $s < S1$ | $S1 <= s <= S2$ | $s > S2$ |
| $C < C1$ | M = "L" | M = "L" | M = "M" |
| $C1 <= c <= C2$ | M = "L" | M = "M" | M = "H" |
| $c > C2$ | M = "M" | M = "H" | M = "H" |

Next, the process advances to a step S207 to judge if the processing of the transform rule is finished. If the result of the judgment is No, the process returns to step S201 to import a new data transform rule for analysis; if the result of the judgment is Yes, then the process advances to a step S208 to deploy a resource energy consumption optimization policy of the data transform node server according to the predicted resource energy consumption parameters of the data transform node server. Specifically, the predicted resource energy consumption parameters of the data transform node server include resource energy consumption parameters in the data extracting phase, the data processing phase and the data storing phase, and the resource energy consumption optimization policy of the data transform node server is deployed according to the resource energy consumption parameters of the three phases. It should be understood that the resource energy consumption optimization rule can be any rule in the prior art which is capable of realizing optimized distribution of resource energy consumption.

By taking the above data transform rule for coordinate conversion (x, y, z→x', y', z') as an example, resource energy consumption parameters predicted in the three phases as shown in Table 5 are obtained by the above analysis. The data transform node server can deploy the energy consumption optimization policies of the CPU, memory, and disk in the three phases according to the resource energy consumption parameters. As shown in Table 5, the energy consumption of the CPU in both the data extracting phase and the data storing phase is low, so voltage and frequency of the CPU can be reduced to reduce energy consumption; the energy consumption of CPU in the data processing phase is high, so voltage and frequency of the CPU can be increased to increase energy consumption; the memory utilization rate in all of the three phases is low, so access frequency of the memory can be decreased; the disk I/O utilization rate is middle (M) in the data extracting phase and is low (L) in the data processing phase and the data storing phase; and the energy consumption of the disk can be increased or decreased by adjusting the power supply state for the disk having a plurality of power supply states and adjusting the rotating speed of for the disk having multiple rotating speeds. In actual applications, one can perform statistics of an overall energy consumption requirement of the system resources and reasonably adjust it according to the predicted resource energy consumption parameters of the data transform rule, thereby optimizing resource energy consumption distribution.

The data transform method according to an embodiment of the invention analyzes resource energy consumption parameters of the data transform node server directly according to the data transform rule to be used, without the need of analyzing the history load to predict resource energy consumption parameters, thereby avoiding inaccurate prediction results due to a large deviation between the history load and the actual load, and can therefore provide a more accurate and efficient resource energy consumption prediction.

TABLE 5

An example of predicting resource energy consumption parameters in the three phases

|  | Data extracting phase | Data processing phase | Data storing phase |
| --- | --- | --- | --- |
| CPU energy consumption | "L" | "H" | "L" |

TABLE 5-continued

An example of predicting resource energy consumption parameters in the three phases

|  | Data extracting phase | Data processing phase | Data storing phase |
| --- | --- | --- | --- |
| Disk I/O utilization rate | "M" | "L" | "L" |
| Memory utilization rate | "L" | "L" | "L" |

According to an embodiment of the invention, resource usage conditions predicted by a plurality of data transform rules in the three phases can be analyzed and compared. If the result of the analysis shows that there are a plurality of data transform rules that have at least one identical energy consumption parameter in the three phases, then the resource energy consumption optimization policy of the data transform node server can be deployed uniformly. By integrating the plurality of data transform rules together for processing, the frequency of adjusting the resource energy consumption is reduced and energy consumption optimizing efficiency is improved.

According to an embodiment of the invention, the method further includes: predicting energy consumption parameters of the source node server in the data extracting phase according to the predicted energy consumption parameters of the data transform node server in the data extracting phase, and predicting energy consumption parameters of the destination node server in the data storing phase according to the predicted energy consumption parameter of the data transform node server in the data storing phase. Since the data extracted in the data extracting phase comes from the source node server and the data is to be written to the destination node server in the data storing phase, the size of the data read at each time and the size of the data written at each time also reflect data throughputs of the source node server and the destination node server, respectively. The CPU load in the data extracting phase and the data storing phase also reflect the CPU load of the source node server and the destination node server in the phase. By taking the above data transform rule for coordinate conversion (x, y, z→x', y', z') as an example, energy consumption parameters of the source node server and the destination node server in the data extracting phase and data storing phase can be predicted according to the energy consumption parameters of the data transform node server in the data extracting phase and the data storing phase. The source node server and the destination node server can adjust resource energy consumption according to the predicted resource energy consumption conditions to deploy the resource energy consumption optimization policy.

TABLE 6

An example of energy consumption parameters of the source node server and the destination node server.

|  | Source node server | Destination node server |
| --- | --- | --- |
| CPU load | "L" | "L" |
| Disk I/O utilization rate | "M" | "L" |
| Memory utilization rate | "L" | "L" |

Figure 5:
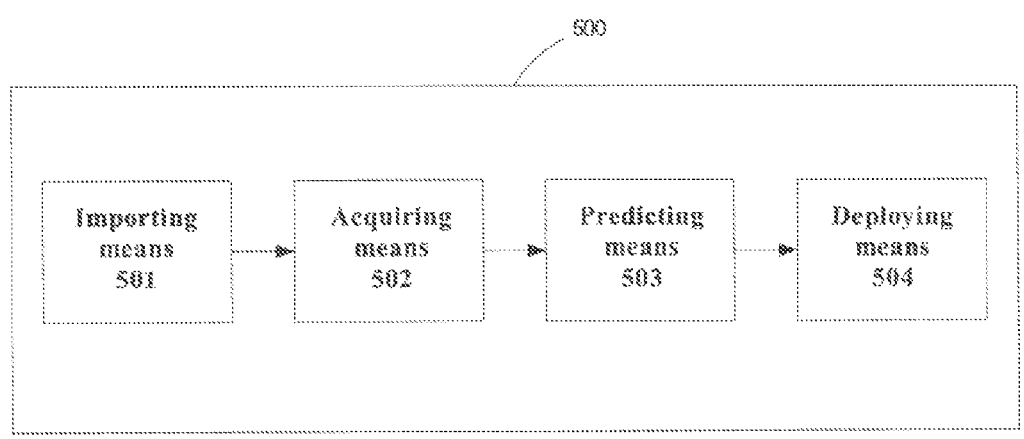
FIG. 5 is a block diagram showing a data transformer according to an embodiment of the invention.

According to the same inventive concept, the present invention proposes a data transformer. FIG. 5 is a block diagram 500 showing a data transformer according to an embodiment of the invention. The data transformer includes: importing means 501 configured to import a data transform rule; acquiring means 502 configured to acquire from the data transform rule a source data definition, a destination data definition and a data transform rule definition; predicting means 503 configured to predict resource energy consumption parameters of a data transform node server according to the source data definition, the destination data definition and the data transform rule definition; and deploying means 504 configured to deploy a resource energy consumption optimization policy of the data transform node server according to the predicted resource energy consumption parameters of the data transform node server, wherein the resource energy consumption parameters include at least one of CPU energy consumption, memory utilization rate, and disk I/O utilization rate.

The predicting means 503 is further configured to predict the resource energy consumption parameters of the data transform node server in the data extracting phase, data processing phase and data storing phase, according to the source data definition, the destination data definition and the data transform rule definition.

According to an embodiment of the invention, the predicting means 503 is configured to identify an operating type of the data transform rule according to the data transform rule definition. If it is identified that the operating type of the data transform rule is direct copying, resource energy consumption parameters of the data transform node server in the data extracting phase, the data processing phase and the data storing phase are predicted based on the source data definition and the destination data definition. Since direct copying does not consume calculating resources in the three phases, it can be predicted that, the CPU energy consumption in the three phases all is low (L). The memory utilization rate and disk I/O utilization rate of the data transform node server in the data extracting phase and the data storing phase can be predicted according to the size of the data written at each time and the count of writing. Furthermore, since direct copying does not occupy memory and disk resources in the data processing phase, it can be predicted that both the memory utilization rate and disk I/O utilization rate are low (L).

According to an embodiment of the invention, if it is identified that the operating type of the data transform type is data type conversion, resource energy consumption parameters of the data transform node server in the data extracting phase, the data processing phase and the data storing phase are predicted based on the source data definition and the destination data definition. Since data type conversion has lower requirements for CPU resources in the data extracting phase and the data storing phase, the energy consumption of the CPU is set as low "L". In the data processing phase of data type conversion, the CPU energy consumption condition corresponding to a specific data type conversion can be determined according to the specific data type conversion. However, in the data processing phase, since memory and disk resources are not occupied, the memory utilization rate and the disk I/O utilization rate may be set as low "L"; moreover, since memory and disk resources need to be occupied in the data extracting phase and the data storing phase, the memory utilization rate and the disk I/O utilization rate need to be determined according to the size of the data read and written by the data transform at each time as well as the reading and writing count.

According to an embodiment of the invention, if it is identified that the data transform type is macro conversion, resource energy consumption parameters of the data transform node server in the data extracting phase, the data processing phase and the data storing phase are predicted based on the source data definition and the destination data definition. The CPU energy consumption conditions of the macro operation in the three phases can be measured by the CPU loads in the three phases. Since the macro operation does not need disk resources in the data processing phase, the disk I/O utilization rate is low "L", and the memory utilization rate of the data transform node server in the data processing phase can be predicted according to the size of the data read and written at each time as well as the number of the intermediate values. The memory and disk reading/writing energy consumption conditions in the data extracting phase and the data storing phase can be determined according to the size of the data read and written at each time in the data extracting phase and the data storing phase and the number of numerical values corresponding to the data extracting phase and the data storing phase.

According to an embodiment of the invention, the predicting means 503 is further configured to predict energy consumption parameters of the source node server in the data extracting phase according to the predicted energy consumption parameters of the data transform node server in the data extracting phase. It also predicts energy consumption parameters of the destination node server in the data storing phase according to the predicted energy consumption parameter of the data transform node server in the data storing phase.

According to an embodiment of the invention, the deploying means 504 is further configured to deploy, for a plurality of data transform rules that have at least one identical energy consumption parameter among the energy consumption parameters predicted in the data extracting phase, the data processing phase, and the data storing phase, the resource energy consumption optimization policy of the plurality of data transform rules in the data transform node server uniformly.

As will be appreciated by one skilled in the art, at least some aspects of the present invention may be alternatively embodied as a computer program product. The programs defining the functions of the present invention can be transmitted to a data storage system or computer system through various signal carrying medium including, but not limited to, un-writable storage mediums (e.g. CD-ROM), writable storage mediums (e.g. floppy disk, hard disk driver, readable/writable CD-ROM, optical medium) and communication mediums such as computer and telephone networks including Ethernet. Therefore, it should be understood that, such signal carrying mediums, when carrying or coding with computer readable instructions managing functions of the method of the present invention, represents alternative embodiments of the present invention. The present invention can be realized in the manner of hardware, software, firmware or any combination thereof. The present invention can be realized in one computer system in an integrated manner, or be realized in a distributed manner, wherein the different components are distributed in several computer systems inter-connected with each other. Any computer systems or other apparatus that is suited to perform the method described in the present application are suitable. The present invention can be realized in computer software in combination with general purpose computer hardware, wherein when the computer program is loaded and run, the computer system is controlled to perform the method of the present invention or constructs the system of the present invention.

The above description has described embodiments of the present invention for illustrative purposes. The above description is not exhaustive and does not intend to limit the present invention to the disclosed specific forms. Obviously, from the above teaching, many modifications and changes are possible. For those skilled in the art, it is obvious that such modifications and changes are included in the scopes of the present invention defined by the appended claims.

What is claimed is:

1. A data transform method, comprising:
   importing a data transform rule;
   acquiring, directly from the data transform rule, a source data definition, a destination data definition and a data transform rule definition, wherein the data transform rule specifies how existing application-level data is transformed from a source data form described by the source data definition to a target data form described by the destination data definition;
   predicting values of resource energy consumption parameters of a data transform node server based on characteristics of the source data form identified within the source data definition, characteristics of the target data form identified within the destination data definition, and the data transform rule definition, wherein the predicting comprises at least:
      identifying, from the data transform rule definition, a type of operation to be performed for transforming the application-level data from the source data form to the target data form, wherein the values of the resource energy consumption parameters are further predicted based on resource characteristic parameters of the type of operation; and
   deploying a resource energy consumption optimization policy of the data transform node server according to the predicted values of resource energy consumption parameters.

2. The method according to claim 1, wherein the resource energy consumption parameters include at least one of CPU energy consumption, memory utilization rate, and disk I/O utilization rate.

3. The method according to claim 2, wherein predicting values of resource energy consumption parameters further comprises:
   predicting the values of resource energy consumption parameters of the data transform node server in a data extracting phase, a data processing phase and a data storing phase.

4. The method according to claim 3, further comprising:
   predicting values of resource energy consumption parameters of a source node server in the data extracting phase according to the predicted values of resource energy consumption parameters of the data transform node server in the data extracting phase.

5. The method according to claim 3, further comprising:
   predicting values of resource energy consumption parameters of a destination node server in the data storing phase according to the predicted values of resource energy consumption parameters of the data transform node server in the data storing phase.

6. The method according to claim 3, further comprising:
   deploying, for a plurality of data transform rules that have at least one identical value for an energy consumption parameter among the predicted values of resource energy consumption parameters, the resource energy consumption optimization policy of the plurality of data transform rules in the data transform node server uniformly.

7. The method according to claim 1, wherein the type of operation to be performed comprises at least one of direct copying, data type conversion and macro conversion.

8. The method according to claim 7, further comprising:
   predicting the memory utilization rate and the disk I/O utilization rate of the data transform node server in the data extracting phase and the data storing phase according to the size of the data written each time and the count of the writing, wherein the type of operation to be performed is selected from the group consisting of direct copying or data type conversion.

9. The method according to claim 7, further comprising:
   predicting the memory utilization rate and the disk I/O utilization rate in the data extracting phase and the data storing phase according to the size of the data read and written at each time and the number of numerical values processed in the data extracting phase and the data storing phase, wherein the type of operation to be performed is macro conversion.

10. The method according to claim 7, further comprising:
    predicting the memory utilization rate of the data transform node server in the data processing phase according to the size of data read and written at each time in the data processing phase and the number of intermediate values, wherein the type of operation to be performed is macro conversion.

11. A data transformer comprising:
    importing means configured to import a data transform rule;
    acquiring means configured to acquire from the data transform rule a source data definition, a destination data definition and a data transform rule definition, the source data definition at least comprising a set of source data objects and a data type of each of the set of source data objects, and the destination data definition at least comprising a set of destination data objects that the set of source data objects are to be transformed into and a data type of each of the set of destination data objects, wherein the data transform rule specifies how existing application-level data is transformed from a source data form described by the source data definition to a target data form described by the destination data definition;
    predicting means configured to predict resource energy consumption parameters of a data transform node server based on characteristics of the source data form identified within the source data definition, characteristics of the target data form identified within the destination data definition, and the data transform rule definition wherein the predicting comprises at least:
       identifying, from the data transform rule definition, a type of operation to be performed for transforming the application-level data from the source data form to the target data form, wherein the values of the resource energy consumption parameters are further predicted based on resource characteristic parameters of the type of operation; and
    deploying means configured to deploy a resource energy consumption optimization policy of the data transform node server according to the predicted resource energy consumption parameters of the data transform node server.

12. The data transformer according to claim 11, wherein the resource energy consumption parameters include at least one of CPU energy consumption, memory utilization rate, and disk I/O utilization rate.

13. The data transformer according to claim 11, wherein the type of operation to be performed comprises at least one of direct copying, data type conversion and macro conversion.

14. The data transformer according to claim 13,
wherein the predicting means is further configured to predict the memory utilization rate and the disk I/O utilization rate of the data transform node server in the data extracting phase and the data storing phase according to the size of the data written at each time and the count of the writing; and
wherein the type of operation to be performed is selected from the group consisting of direct copying or data type conversion.

15. The data transformer according to claim 13,
wherein the predicting means are further configured to predict the memory utilization rate and the disk I/O utilization rate in the data extracting phase and the data storing phase according to the size of the data read and written at each time and the number of numerical values processed in the data extracting phase and the data storing phase; and
wherein the type of operation to be performed is macro conversion.

16. The data transformer according to claim 13,
wherein the predicting means are further configured to predict the memory utilization rate of the data transform node server in the data processing phase according to the size of the data read and written at each time and the number of intermediate values in the data processing phase; and
wherein the type of operation to be performed is macro conversion.

17. The data transformer according to claim 12, wherein the predicting means are further configured to predict the resource energy consumption parameters of the data transform node server in a data extracting phase, a data processing phase and a data storing phase.

18. The data transformer according to claim 17, wherein the predicting means are further configured to predict the resource energy consumption parameters of a source node server in the data extracting phase according to the predicted resource energy consumption parameters of the data transform node server in the data extracting phase.

19. The data transformer according to claim 17, wherein the predicting means are further configured to predict the resource energy consumption parameters of a destination node server in the data storing phase according to the predicted resource energy consumption parameters of the data transform node server in the data storing phase.

20. The data transformer according to claim 17, wherein the deploying means are further configured to deploy, for a plurality of data transform rules that have at least one identical energy consumption parameter among the predicted resource energy consumption parameters, the resource energy consumption optimization policy of the plurality of data transform rules in the data transform node server uniformly.

* * * * *